United States Patent
Vaughn

(10) Patent No.: US 9,321,446 B2
(45) Date of Patent: Apr. 26, 2016

(54) DIFFERENTIAL RELAY TYPE BRAKE CYLINDER MAINTAINING VALVE

(71) Applicant: New York Air Brake Corporation, Watertown, NY (US)

(72) Inventor: Lawrence E. Vaughn, Watertown, NY (US)

(73) Assignee: New York Air Brake Corporation, Watertown, NY (US)

(*) Notice: Subject to any disclaimer, the term of this patent is extended or adjusted under 35 U.S.C. 154(b) by 18 days.

(21) Appl. No.: 14/018,529

(22) Filed: Sep. 5, 2013

(65) Prior Publication Data
US 2015/0061360 A1 Mar. 5, 2015

(51) Int. Cl.
| | | |
|---|---|---|
| *B60T 15/24* | (2006.01) | |
| *B60T 15/02* | (2006.01) | |
| *B60T 15/18* | (2006.01) | |
| *B60T 13/26* | (2006.01) | |
| *B60T 17/22* | (2006.01) | |
| *B60T 13/38* | (2006.01) | |

(52) U.S. Cl.
CPC ............ *B60T 15/021* (2013.01); *B60T 13/26* (2013.01); *B60T 15/184* (2013.01); *B60T 17/228* (2013.01); *B60T 13/385* (2013.01)

(58) Field of Classification Search
CPC ..... B60T 13/365; B60T 13/38; B60T 13/385; B60T 13/406; B60T 13/40; B60T 15/021; B60T 15/184
See application file for complete search history.

(56) References Cited

U.S. PATENT DOCUMENTS

| | | | |
|---|---|---|---|
| 2,836,466 A | 5/1958 | Cook | |
| 5,326,159 A | 7/1994 | Hart et al. | |
| 5,509,727 A | 4/1996 | Hart et al. | |
| 5,634,696 A | 6/1997 | Hart et al. | |
| 2014/0125115 A1* | 5/2014 | Gaughan | B60T 8/38 303/33 |

OTHER PUBLICATIONS

International Search Report Form PCT/ISA/210, International Application No. PCT/US2013/065243, pp. 1-3, Dated May 9, 2014.

* cited by examiner

*Primary Examiner* — Nicholas J Lane
(74) *Attorney, Agent, or Firm* — David L. Nocilly; Bond Schoeneck & King, PLLC

(57) ABSTRACT

A brake cylinder maintaining valve feeds brake pipe (BP) pressure through a choke to replenish and maintain brake cylinder (BC) pressure up, when the pressure in the brake cylinder drops below its original set pressure. In one embodiment, the brake cylinder maintaining valve may be a differential type valve having an input diaphragm and an output diaphragm having different surface areas.

6 Claims, 3 Drawing Sheets

DIFFERENTIAL RELAY TYPE BRAKE CYLINDER MAINTAINING VALVE

BACKGROUND OF THE INVENTION

1. Field of the Invention

The present disclosure relates generally to control valves for use in freight car brake equipment, and more particularly to a valve that maintains the brake cylinder pressure in such control valves.

2. Statement of the Prior Art

Control valves used in freight car brake systems or equipment (e.g., the DB-60 control valve manufactured by New York Air Brake LLC, Watertown, N.Y. USA or the ABD/ABDW/ABDX-type control valves manufactured by Wabtec Corporation, Wilmerding, Pa. USA) are well known. If such control valves supply air pressure to the brake cylinder of a freight car, and the plumbing between the control valve and the freight car has a leak, then the brake cylinder will not maintain the original set pressure. This could be due to, for example, a leaking packing cup in the brake cylinder, a leaking hose, or any other reason that would lead to the leaking of pressure between the connection of the control valve and the brake cylinder.

One approach is described in U.S. Pat. No. 4,474,412. The freight car brake equipment for truck mounted air brakes includes an ABDW-type valve and auxiliary and emergency reservoirs with pipe connections therebetween. There is a brake pipe and a connection between the brake pipe and the ABDW valve. Truck mounted brake cylinders are located at each truck and a brake cylinder pipe, which connects the brake cylinders with the ABDW-type valve. A brake cylinder pressure maintaining valve is connected to the brake pipe, brake cylinder pipe and volume reservoir, as well as to the emergency reservoir. The brake cylinder pressure maintaining valve operates to provide air from the volume reservoir to the brake cylinder pipe and thus the brake cylinders when pressure in the brake cylinder pipe drops below a predetermined level, thus insuring a minimum brake application pressure, regardless of the piston travel of the brake cylinders.

Another approach is described in U.S. Pat. No. 4,493,511. This freight car brake equipment includes a brake cylinder pressure maintaining valve which, during brake application, takes air from the brake pipe and feeds it into the brake cylinder until it reaches minimum brake pressure. To avoid the need for an extra valve, the brake cylinder pressure maintaining valve is used as a quick service bulb exhaust valve during brake release and means are provided to ensure that the brake cylinder pressure maintaining valve opens immediately on brake release. Once the brakes have been applied, pressure in the brake cylinder is maintained from the quick service bulb. Brake cylinder exhaust pressure taken from a point after the brake cylinder exhaust valve, but before the brake cylinder exhaust choke, is directed to a chamber above the inshot and brake cylinder maintaining valve diaphragm. Since the pressure in a port upstream of the brake cylinder exhaust choke attains a pressure within about 10 psi of the chamber, a spring in another chamber can open the brake cylinder maintaining valve. Thus, immediate opening of brake cylinder maintaining valve occurs when the bi-stable operator moves to the release position. Bulb pressure from a QS bulb is then able to flow via the BC maintaining choke and fall with the fall of brake cylinder pressure.

Such prior art approaches are somewhat complicated. It would be far more desirable to provide a brake cylinder maintaining valve which is simpler to implement and operate.

SUMMARY OF THE INVENTION

One means of avoiding such problems may be to have a valve that maintains the brake cylinder pressure. When the pressure in the brake cylinder drops below its original set pressure, such a maintaining valve may feed brake pipe (BP) pressure through a choke to replenish and maintain brake cylinder (BC) pressure up to a certain point. If the leak is too great (i.e., to the extent it exceeds the capacity of the choke), the brake cylinder will not be maintained. Such a maintaining valve may be either integrated into the control valve, or it may be mounted remotely to the brake system. If mounted remotely, it may be connected by multiple ways, including through a conventional 4-port access plate. See, e.g., commonly-owned and co-pending U.S. application Ser. No. 13/652,896, filed Oct. 16, 2012, which is incorporated by reference as if more fully set forth herein.

Other objects, advantages and novel features of the present invention will become apparent from the following detailed description of the invention when considered in conjunction with the accompanying drawings.

DETAILED DESCRIPTION OF THE INVENTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Figure 1:
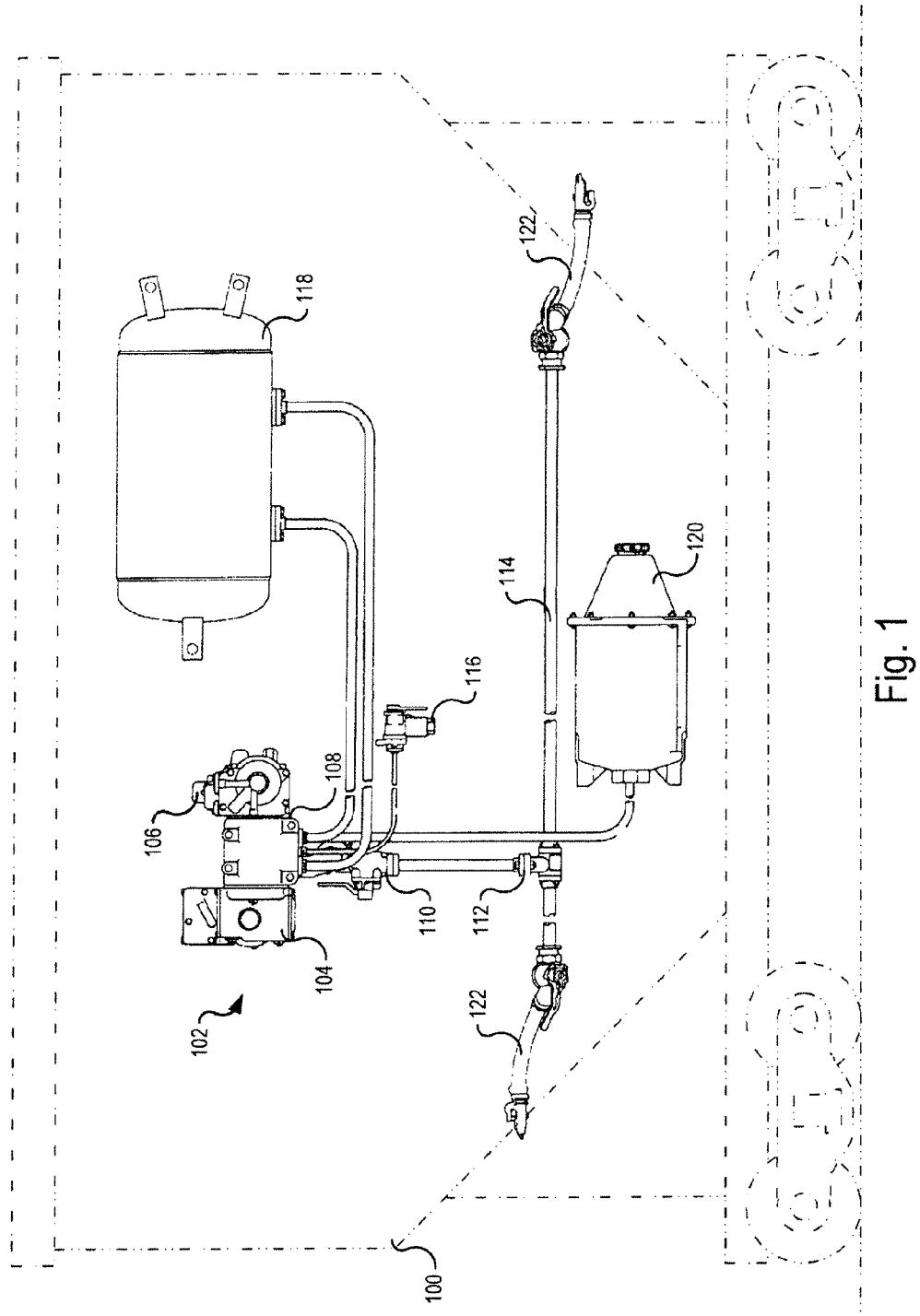
FIG. 1 is a schematic of freight car brake equipment according to the prior art.

Referring now to the drawings, wherein like reference numerals and characters represent like or corresponding parts and steps throughout each of the views, there is shown in FIG. 1 a schematic representation of a brake system associated with a prior art freight or rail car 100. The system may be used to operate air brakes (not shown) in accordance with known embodiments of the prior art. As illustrated, the freight car brake equipment includes a brake control valve 102 having a service portion 104 and an emergency portion 106 connected to a pipe bracket 108. A cut-off cock 110 connects, through a branch pipe tee 112, brake pipe 114 to the pipe bracket 108 at port BP. A retaining valve 116 connected to exhaust EX is connected to pipe bracket 108 at retainer port RET. A combined reservoir 118, having an auxiliary AUX RES and an emergency reservoir EMER RES is connected to respective ports AR and ER of pipe bracket 108. A brake cylinder 120 may be connected through an empty/load device (not shown) to brake cylinder port BC. The elements described so far are part of normal freight car brake equipment. The service portion 104, emergency portion 106, and pipe bracket 108 are standard parts of a control valve, for example, a DB-60 control valve from New York Air Brake LLC or Knorr Bremse AG. Similarly, they may be an ABD/ABDW/ABDX or other AAR approved brake valves.

Air used to operate the brakes on rail cars may be transmitted through brake pipe 114 to brake control valve 102, and may accumulate in combined reservoir 118. Brake pipe 114 may be coupled with corresponding brake pipes in attached rail cars (not shown) through AAR standard air brake hoses 122 to form a train line operable to communicate air from an associated locomotive (not shown) to each rail car 100 attached to the locomotive as part of a train. Brake pipe 114 may serve at least two purposes. First, air may travel through brake pipe 114 to accumulate in combined reservoir 118 for each individual rail car 100. Second, brake pipe 114 may facilitate transmission of a pressure drop that activates respective brakes associated with each rail car 100.

Figure 3:
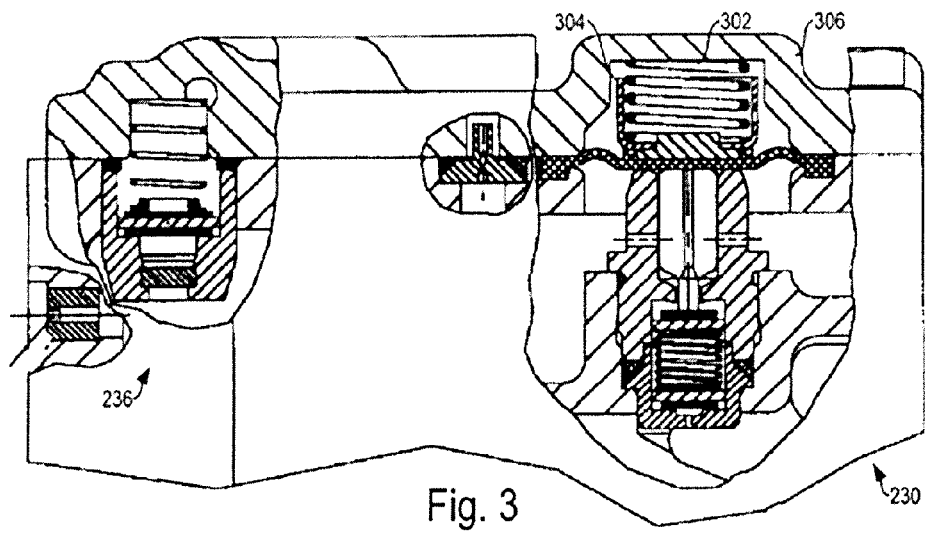
FIG. 3 is a first diagrammatic view of a brake cylinder maintaining valve according to one embodiment of the present invention.
Figure 4:
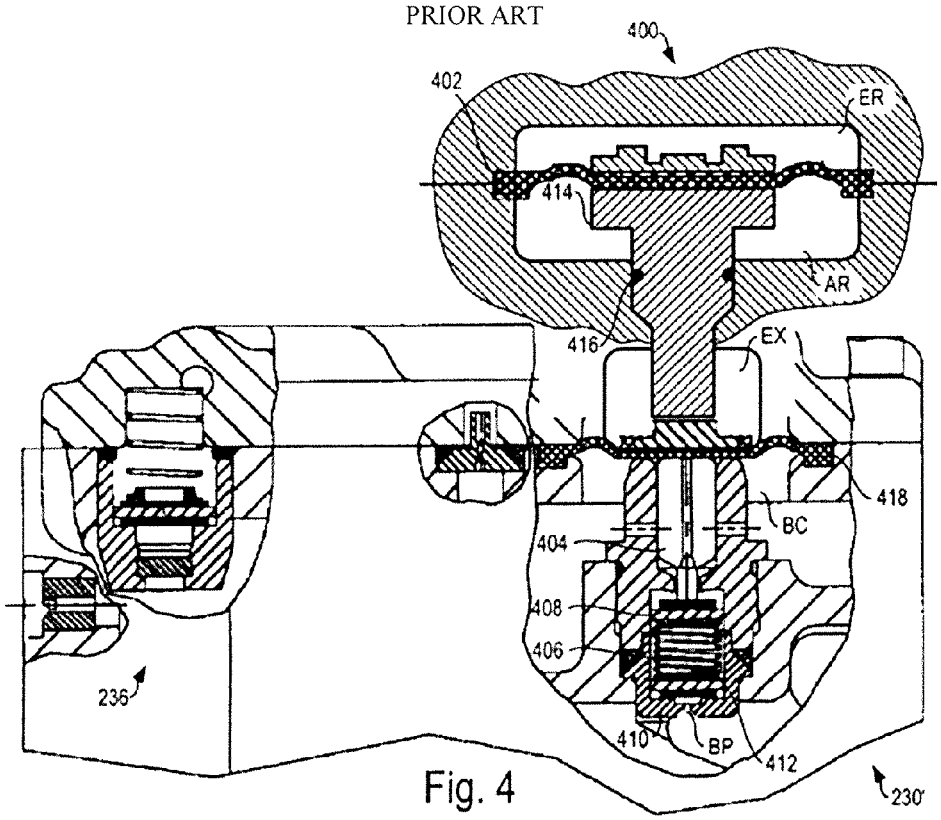
FIG. 4 is a second diagrammatic view of a brake cylinder maintaining valve according to another embodiment of the present invention.

Although the improvement herein will be shown in FIGS. 3-4 to have been incorporated into the service portion of the DB-60, the present improvement may be provided to any brake control valve portion which includes a piston responsive to brake pipe pressure on one side and a reservoir as the source of brake cylinder pressure on the other side of the diaphragm. Thus, the invention may be used in other AAR-styled brake control valves or non-AAR brake control valves, including ABD/ABDW/ABDX-type control valves as described hereinafter below. Only those portions of the service portion of the DB-60 which explain the operation of the present invention have been included in the schematics and others have been intentionally deleted for sake of clarity.

Pipe bracket 108 supports and aligns both service 104 and emergency 106 portions and supplies air to the valvular components. The precontrolled flow of air to and from the brake pipe 114, brake cylinder 120, combined auxiliary/emergency reservoir 118 and retaining valve 116 is also directed through the pipe bracket 108 to which all connections are made, with butt or socket welded flange fittings.

The specific functions of the service portion 104 are to supply air to the combined reservoir 118 during initial charging of the system and recharging following release of an application; to direct auxiliary reservoir AR air into the brake cylinder 120 depending on a predetermined rate and amount of brake pipe pressure reduction; to exhaust brake cylinder BC air during release after an application; to guarantee stability of the brake system in release condition against undesired application of the brakes which may result from permissible brake system leakage; and to guarantee stability of the brake system in service lap condition against undesired release of the brakes which may result from permissible auxiliary reservoir leakage.

The service portion 104 also functions to support recharge of the brake system during the release of a service application by feeding emergency reservoir ER air into the brake pipe 114 independent from the main piston system; to guarantee minimum reduction during initial brake pipe reduction and maintain minimum brake cylinder BC pressure by connecting quick service chamber QS-Ch. and brake cylinder BC pressures; to support initial brake pipe reduction by venting brake pipe BP air to the atmosphere ATM during the preliminary quick service stage; to support recharge of the brake system after manual release subsequent to an emergency application by connecting the pressure of the auxiliary reservoir to the brake pipe 114, to permit exhaust of retainer held brake cylinder pressure in the retainer pipe and volumes during manual release subsequent to a service reduction; to directly release brake cylinder pressure independent of the main piston system after any application by manual activation of the release handle; to provide manual drain means for auxiliary reservoir and emergency reservoir pressures; and to release the main piston system after a service application by manual activation of release handle.

Figure 2:
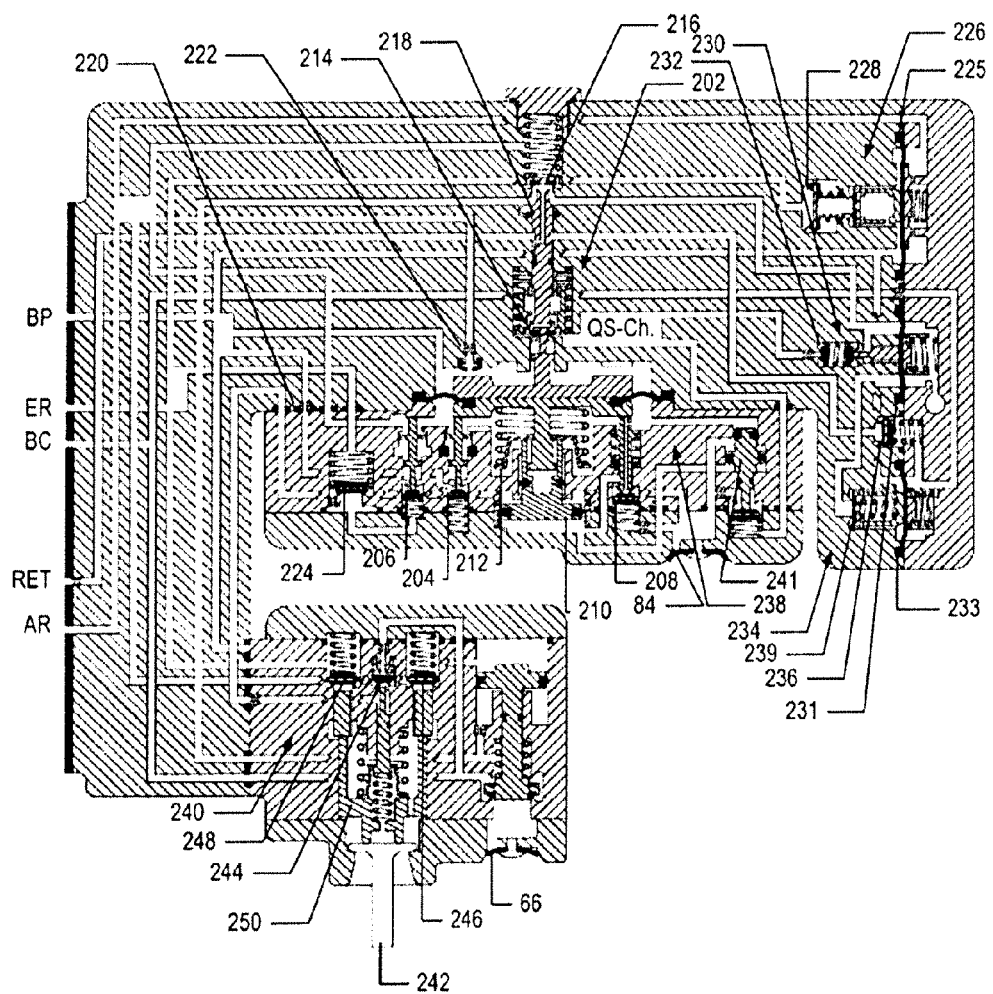
FIG. 2 is a diagrammatic view of a service portion of a brake control valve used in the freight car brake equipment shown in FIG. 1.

As shown in FIG. 2, the service main piston 202 compares brake pipe BP and auxiliary reservoir AR pressures acting on equal areas. Auxiliary reservoir charging valve 204, emergency reservoir charging valve 206, and balancing valve 208 are spaced uniformly at 120° intervals around the same diameter and are mechanically operated by the bottom side of the piston. The coaxially-arranged balancing piston 210 is pressurized with auxiliary reservoir AR air by the balancing valve 208 and acts on the balancing spring 212 which stabilizes the main piston system 202 in service lap position.

The main piston 202 operates the quick service inlet valve 214, which allows brake pipe BP air to flow to the quick service chamber (QS-Ch.). The auxiliary reservoir/brake cylinder inlet 216 and brake cylinder/retainer outlet valves 218 are also mechanically operated by the main piston 202. Stability of the main piston system 202 in the release position is provided by means of the sensitivity choke 220 and stability choke 222; stability in the service lap positions is provided by means of the stability choke 222. A separate emergency reservoir charging check valve/choke 224 arrangement prevents uncontrolled return flow of emergency reservoir ER air into the auxiliary reservoir when releasing the brakes from a service application. Thus, no undesired reapplication of the brakes will occur during release.

A metal-reinforced rubber diaphragm 225 of the service accelerated release valve 226 also compares brake pipe BP and auxiliary reservoir AR pressures acting on equal areas. This component operates independently of the service main piston system 202. When the service accelerated release valve 226 is triggered, emergency reservoir ER air passes by the high sensitivity back flow check valve 228 into the brake pipe BP.

A metal-reinforced rubber diaphragm 233 of the quick service limiting valve 230 is pressurized by brake cylinder BC air and allows restricted flow of brake pipe/quick service air to the brake cylinder 118 to a predetermined value. The quick service limiting check valve 232 prevents return flow of brake cylinder BC air to atmosphere ATM during emergency applications and in the event of a retainer is being set in "high pressure retaining" position with the service main piston system 202 in the release position.

A metal-reinforced rubber diaphragm 233 of the emergency release auxiliary reservoir reduction valve 234 is pressurized by brake pipe and brake cylinder air in opposite sides. After manual release of brake cylinder pressure subsequent to an emergency application, increasing brake pipe pressure during recharging operates the valve and allows auxiliary reservoir air to flow via the emergency release auxiliary reservoir reduction check valve 234 into the brake pipe and assists during brake pipe recharging. The retaining check valve 236, by means of a choke, allows reduction of retainer held brake cylinder air to a pressure level which allows the brake cylinder piston to move to release position.

The quick service valve 238 piston is pressurized by auxiliary reservoir AR air on one side and controls the flow of quick service QS air to atmosphere ATM. As soon as the service main piston system 202 allows the balancing valve 208 to pressurize the larger opposite area of the quick service valve piston with auxiliary reservoir air, the venting of quick service/brake pipe air will be interrupted. The piston of release valve 240 is pressurized on both sides with brake cylinder BC air and seals the connection from brake cylinder 120 to atmosphere ATM.

Upon activation of the release valve handle 242, the upper side of the piston is vented through the release exhaust valve 244 which allows the piston to open the passage from brake cylinder 120 to atmosphere ATM. The piston remains in this position until brake cylinder lockup pressure below the piston is released by the service main piston system 202 upon its release. Auxiliary reservoir exhaust 246 and emergency reservoir exhaust 248 valves are mechanically operated by the release valve lifter 250 and allow high capacity flow of auxiliary reservoir/emergency reservoir air to the atmosphere in order to drain the brake system.

FIG. 3 depicts an enlarged, partially cross-sectional view of a part of service portion 104 (e.g., a DB-10 service portion of the DB-60 control valve manufactured by New York Air Brake LLC, Watertown, N.Y. USA), including its quick service limiting valve 230 and retaining check valve 236. According to a first embodiment of the invention, the quick service limiting valve spring 302, spring seat 304, and cover 306 are first removed and reconfigured so that the differential relay components can be added as explained in greater detail herein below. Those differential relay components include diaphragms or pistons of different surface areas to produce an output that is different than the input or control. In the case of the differential relay that will be described herein below, the area ratio between the input diaphragm and the output diaphragm may be about 2:1 to 4:1, preferably about 3:1. This differential relay or, as it may be called hereinafter, brake cylinder maintaining valve (BCMV) will match the calibration of the DB-60 braking system regardless of the initial level of brake pipe charging, provided the DB-60 braking system has been calibrated per current AAR equalization requirements.

Release and Charging Position

As shown in FIG. 4, BCMV 400 may be controlled by the balance of pressure between the emergency reservoir (ER), auxiliary reservoir (AR), and brake cylinder (BC). With the DB-10 service portion 104 in the release and charging position, the emergency reservoir is charged from the auxiliary reservoir, and the brake cylinder BC and quick service volume QS-Ch. pressures will be exhausted to zero. With auxiliary reservoir AR pressure higher than emergency reservoir ER pressure, a control diaphragm 402 of the BCMV 400 will be positioned in the release or lap position. In this position, piston stem 404 will be lifted by the force of spring 406 allowing check valve 408 to close. With the quick service volume QS-Ch. exhausted to zero, there will be no brake pipe (BP) pressure present at choke 410 allowing check valve 412 to close. When the DB-10 service portion 104 has fully charged, there will not be an imbalance across diaphragm 402. The DB-10 service portion 104 will, as a result, remain in the charging lap position.

Service Brake Application

To initiate a brake application pressure in the brake pipe BP must be reduced below auxiliary reservoir AR pressure at the DB-10 service portion 104. When brake pipe BP pressure has been reduced a sufficient amount (e.g., approximately ½ psi), the first or preliminary stage of service will be initiated. During this first stage of service, brake pipe BP pressure may be reduced locally at each car by allowing it to charge the quick service volume QS-Ch., which will stay connected and charged to the level of brake pipe BP pressure for the duration of the service brake application. It is this pressure that may be used to replenish any brake cylinder BC pressure that leaks off during the duration of the service brake application.

Operation of the Differential Relay Type Brake Cylinder Maintaining Valve

A preset pressure spring may be added to produce proper minimum service brake cylinder pressure levels. That is, a spring may be added to the assembly that could produce a preset pressure output to the brake cylinder similar to the pressure levels produced by the current brake cylinder limiting valve. If necessary, the spring could be added to the brake cylinder maintaining system that would bias the system either to lower the pressure output or increase the pressure output, depending on which side of control diaphragm 402 the spring is added.

With the brake system fully charged, the pressures in the emergency and auxiliary reservoirs are equal and the force across control diaphragm 402 is balanced. When brake pipe BP pressure is reduced to initiate a service brake application, auxiliary reservoir AR pressure is connected, via the DB-10 service portion 104, to the brake cylinder 120. The DB-10 service portion 104 is constructed such that for every 1 psi that brake pipe BP pressure is reduced, auxiliary reservoir AR pressure will also be reduced 1 psi as a result of charging the brake cylinder 120. Emergency reservoir ER pressure remains constant at its fully charged level during a service brake application, and may be used as a reference or control pressure for the BCMV 400.

As auxiliary reservoir AR pressure is reduced below emergency reservoir ER pressure, a differential of force is established across the control diaphragm 402. This, in turn, causes the control diaphragm 402, piston 414 with seal 416, brake cylinder feedback diaphragm 418, check valve lifter 404, and charging check valve 408 to move against check valve spring 406. As a result, check valve spring 406 is compressed and opens charging check valve 408. With brake pipe BP air present at the limiting valve charging choke 410, back flow check valve 412 will be opened by the pressure differential between brake pipe BP and brake cylinder BC pressures, allowing brake pipe BP pressure to flow to brake cylinder 120.

As brake cylinder BC pressure increases, pressure also increases across the surface of the brake cylinder feedback diaphragm 418, which develops an opposing force to the force being exerted by the control diaphragm 402. When the two forces are approximately balanced, the force on brake cylinder feedback diaphragm 418 will move piston 414 and control diaphragm 402 away from charging check valve 408. At the same time, the force of check valve spring 406 will force charging check valve 408 and check valve lifter 404 toward the control diaphragm 402. Charging check valve 408 will then close, cutting off the flow of brake pipe air BP to brake cylinder 120. Under these conditions, the DB-10 service portion 104 control stack and the BCMV 400 are both in lap position, bottling brake cylinder BC pressure at the existing state of charge.

The area differential ratio between control diaphragm 402 and brake cylinder feedback diaphragm 418 is about 2:1 to 4:1, and preferably about 3:1. This will theoretically result in an increase of 3 psi for every 1 psi that auxiliary reservoir AR pressure is reduced below emergency reservoir ER pressure. By using a fixed ratio BCMV 400 in conjunction with a conventional pneumatic brake system calibrated to AAR requirements, a single configuration will perform properly regardless of initial system charge (i.e., the slope of the brake cylinder BC pressure build up curve will be correct for a 70, 80, 90 psi, or any other system operating pressure.

The following table shows the theoretical brake cylinder BC pressure level that will be maintained for each pound that brake pipe BP or auxiliary reservoir AR pressure is reduced.

TABLE I

| BP Pressure | AR Pressure | ER Pressure | BC Pressure |
|---|---|---|---|
| 90.0 | 90.0 | 90.0 | 0.0 |
| 89.0 | 89.0 | 90.0 | 2.6 |
| 88.0 | 88.0 | 90.0 | 5.2 |
| 87.0 | 87.0 | 90.0 | 7.8 |
| 86.0 | 86.0 | 90.0 | 10.4 |
| 85.0 | 85.0 | 90.0 | 13.0 |
| *84.0 | 84.0 | 90.0 | 15.6 |
| 83.0 | 83.0 | 90.0 | 18.2 |
| 82.0 | 82.0 | 90.0 | 20.8 |
| 81.0 | 81.0 | 90.0 | 23.4 |
| 80.0 | 80.0 | 90.0 | 26.0 |
| 79.0 | 79.0 | 90.0 | 28.6 |
| 78.0 | 78.0 | 90.0 | 31.2 |
| 77.0 | 77.0 | 90.0 | 33.8 |
| 76.0 | 76.0 | 90.0 | 36.4 |
| 75.0 | 75.0 | 90.0 | 39.0 |
| 74.0 | 74.0 | 90.0 | 41.6 |
| 73.0 | 73.0 | 90.0 | 44.2 |
| 72.0 | 72.0 | 90.0 | 46.8 |
| 71.0 | 71.0 | 90.0 | 49.4 |
| 70.0 | 70.0 | 90.0 | 52.0 |
| 69.0 | 69.0 | 90.0 | 54.6 |
| 68.0 | 68.0 | 90.0 | 57.2 |
| 67.0 | 67.0 | 90.0 | 59.8 |
| 66.0 | 66.0 | 90.0 | 62.4 |
| 65.0 | 65.0 | 90.0 | 65.0 |

*Minimum Service Brake Application

In the event brake cylinder BC pressure is reduced as a result of leakage, the force across brake cylinder feedback diaphragm 418 is reduced such that the control diaphragm 402 will move piston 414, brake cylinder feedback diaphragm 418, check valve lifter 404 and charging check valve 408 against check valve spring 406, compressing it and opening charging check valve 408. With brake pipe BP air present at the limiting valve charging choke 410, back flow check valve 412 will open due to the pressure differential between brake pipe BP and brake cylinder BC, allowing brake pipe BP pressure to flow to brake cylinder 120, replenishing it to its original level of charge. When the force balance has been reestablished, the BCMV valve stack will move to lap position, cutting off the flow of brake pipe BP air to brake cylinder 120. Under these conditions, the DB-10 service portion control stack, which never moved out of lap position and the BCMV 400 are both in lap position, bottling brake cylinder BC pressure at the existing state of charge.

In the event of an over reduction of brake pipe BP pressure, the level of brake cylinder BC pressure will only be maintained to the level of brake pipe BP pressure. This is in contrast to current brake cylinder limiting valves, which under service braking conditions can only maintain brake cylinder pressure at nominally 10 psi.

In the event of an emergency brake application, the quick service QS-Ch. volume will be vented to zero and back flow check valve 412 will be closed, terminating brake cylinder maintaining. During a release of the brakes, brake pipe BP pressure is reestablished to its original pressure setting, causing the DB-10 service portion to move to release and charging position. In this position, auxiliary AR and emergency reservoir ER pressures will be recharged to brake pipe BP pressure, and brake cylinder BC pressure will be exhausted to zero, returning the BCMV 400 to the conditions described under release and charging above.

Under conditions where the brake cylinder BC pressure is low due to long piston travel or other causes, the BCMV 400 will supplement the standard system to bring brake cylinder BC pressure into the proper operating range. The BCMV 400 is self-calibrating, and does not rely on the proper setting of a spring to develop the proper out put pressure. It is functional throughout the full service application range. This is unlike designs according to the prior art, which are only effective at brake cylinder BC pressure of approximately 10 psi. Moreover, this feature can be added to the current DB-60 and/or ABDX configurations with little modification to the control valve body and cover.

For example, U.S. Pat. No. 5,326,159, which is incorporated by reference as if more fully set forth herein, illustrates embodiments of a quick service limiting valve that is suitable for incorporation into control valves of the ABD/ABDW types. Shop Maintenance 2391, S.4 (July 2005) also includes a Service Bulletin 68-19: New Quick Service Limiting Valve Details; April, 1997, which is also incorporated by reference as if more fully set forth herein, illustrates a quick service limiting valve that is suitable for incorporation into control valves of the ABDX types manufactured by Wabtec Corporation, Wilmerding, Pa. USA. Those of ordinary skill in the art could similarly modify such control valves in the same manner shown in FIG. 4 herein.

Although the present brake cylinder maintaining valve has been described and illustrated in detail, it is to be clearly understood that the same is by way of illustration and example only, and is not to be taken by way of limitation. The scope of the present invention is to be limited only by the terms of the appended claims.

What is claimed:

1. A valve for maintaining brake cylinder (BC) pressure in freight car brake equipment, comprising:
    a control diaphragm with a first surface area and having a source of emergency reservoir ER pressure on a first side and a source of auxiliary reservoir AR pressure on a second side;
    a brake cylinder feedback diaphragm with a second surface area, wherein a first side of the brake cylinder feedback diaphragm is coupled to the second side of the control diaphragm and a source of brake cylinder BC pressure is on a second side of the brake cylinder feedback diaphragm;
    a charging check valve coupled to the second side of the brake cylinder feedback diaphragm and moveable between a first position, where a source of brake pipe BP pressure is isolated from the source of brake cylinder BC pressure and a second position, where the source of brake pipe BP pressure is connected to the source of brake cylinder BC pressure;
    wherein said control diaphragm and said brake cylinder feedback diaphragm together comprise a differential relay configured to maintain brake cylinder (BC) pressure by moving the charging check valve into the second position if the force exerted on the second side of the brake cylinder feedback diaphragm falls below the differential force across the control diaphragm.

2. The brake cylinder maintaining valve (BCMV) according to claim 1, wherein the ratio of the first surface area to the second surface area is between 2:1 and 4:1.

3. The BCMV according to claim 2, wherein the ratio of the first surface area to the second surface area comprises 3:1.

4. The BCMV according to claim 3, further comprising:
    a quick service volume adapted to be charged by the source of brake pipe (BP) pressure;

wherein, in a release and charging position, said emergency reservoir is charged from said auxiliary reservoir, and said brake cylinder BC and said quick service volume pressures are exhausted to zero.

5. The BCMV according to claim 4, wherein, with said auxiliary reservoir AR pressure higher than said emergency reservoir ER pressure, said control diaphragm is configured to be positioned in a release or lap position.

6. The BCMV according to claim 5, further comprising:
a piston stem coupled at one end to said brake cylinder feedback diaphragm;
a spring configured to lift said piston stem;
the charging check valve coupled at the other end of said piston stem and configured to close when said spring lifts said piston stem;
a choke configured to exhaust brake pipe (BP) pressure from said quick service volume; and
a second check valve configured to close when said quick service volume has exhausted to zero.

* * * * *